(12) United States Patent
Miyahara

(10) Patent No.: US 12,141,491 B2
(45) Date of Patent: Nov. 12, 2024

(54) IMAGE FORMING APPARATUS AND IMAGE PROCESSING SYSTEM

(71) Applicant: CANON KABUSHIKI KAISHA, Tokyo (JP)

(72) Inventor: Nobuaki Miyahara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,507

(22) Filed: Nov. 23, 2022

(65) Prior Publication Data
US 2023/0168851 A1    Jun. 1, 2023

(30) Foreign Application Priority Data
Nov. 30, 2021   (JP) ................................ 2021-193806

(51) Int. Cl.
*G06F 3/12*       (2006.01)
*G06T 7/00*       (2017.01)

(52) U.S. Cl.
CPC ............ *G06F 3/1285* (2013.01); *G06T 7/001* (2013.01)

(58) Field of Classification Search
CPC .............................. G06F 3/1285; G06T 7/001
See application file for complete search history.

(56) References Cited

U.S. PATENT DOCUMENTS

| | | | | |
|---|---|---|---|---|
| 2013/0033724 A1* | 2/2013 | Nonaka | ............. | H04N 1/00832 358/1.15 |
| 2018/0059603 A1* | 3/2018 | Miyahara | ........... | H04N 1/00076 |
| 2020/0104987 A1* | 4/2020 | Nakano | ............. | H04N 1/00045 |
| 2022/0413784 A1* | 12/2022 | Shiraki | ................ | G06F 3/1219 |

FOREIGN PATENT DOCUMENTS

JP        2019161345 A        9/2019

* cited by examiner

*Primary Examiner* — Helen Zong
(74) *Attorney, Agent, or Firm* — Canon U.S.A., Inc. IP Division

(57) ABSTRACT

An image forming apparatus is configured to communicate with an external controller configured to generate a job, and includes one or more controllers having one or more processors and one or more memories, the one or more controllers being configured to acquire an image from a first job upon receiving the first job from the external controller and register a reference image generated from the image, to execute inspection processing upon receiving a second job from the external controller, and to perform control to delete the reference image registered upon receiving a cancellation instruction to cancel the second job from the external controller.

19 Claims, 8 Drawing Sheets

IMAGE FORMING APPARATUS AND IMAGE PROCESSING SYSTEM

BACKGROUND

Field of the Disclosure

The present disclosure relates to an image forming apparatus and an image processing system.

Description of the Related Art

Recently, printing systems have been known in which inspection apparatuses can inspect (examine) sheets printed by printing apparatuses during conveyance. In inspection of a printed sheet, an output material (the printed sheet) of an executed print job is subjected to image analysis and compared with a reference image registered in the inspection apparatus to determine whether the printed sheet is normal.

A user can obtain a desired printout material from the printing system including the printing apparatus and the inspection apparatus, while it is required to register a reference image and to search for a corresponding reference image for performing the inspection. Because it takes time to generate a reference image, there is also an issue that print takes time. Japanese Patent Application Laid-Open No. 2019-161345 discusses an inspection system that can search for a registered reference image.

SUMMARY

According to embodiments of the present disclosure, an image forming apparatus is configured to communicate with an external controller configured to generate a job, and includes one or more controllers having one or more processors and one or more memories, the one or more controllers being configured to acquire an image from a first job upon receiving the first job from the external controller and register a reference image generated from the image, to execute inspection processing upon receiving a second job from the external controller, and to perform control to delete the reference image registered upon receiving a cancellation instruction to cancel the second job from the external controller.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. The exemplary embodiments which will be described below do not restrict the present disclosure. All of combinations of the features described in the exemplary embodiments are not always essential to the means for solution according to the present disclosure. An external controller according to the present exemplary embodiment may also be referred to as an image processing controller, a digital front end (DFE), a print server, and the like. An image forming apparatus may also be referred to as a multifunction peripheral (MFP).

Prerequisite technology of the present exemplary embodiment is to be described. In inspection, image data read by an inspection apparatus is compared with correct answer image data registered in the inspection apparatus to determine an inspection result. The inspection apparatus can detect, for example, a missing bar code, a missing ruled line, a missing image, a printing stain, a missing page, and a color shift by inspection. A series of processes of inspection is to be described. There is a configuration in which an image is registered in the inspection apparatus as a reference image in advance, and the reference image is specified and printed to perform inspection. There are at least two methods of registering a reference image. The first method is to register an image generated by scanning an actual printed material as a correct answer image. The configuration is effective for a case where the inspection is finely set while the reference image is previewed, such as a case where an inspection area is to be set to the reference image. The second method is to automatically register image data as the reference image in the inspection apparatus and to print and inspect the image data as it is. With the configuration, a user can perform printing without being conscious of the inspection too much in a case where the inspection is performed without a setting of a detailed inspection item such as dirt inspection of a printed material.

Figure 1:
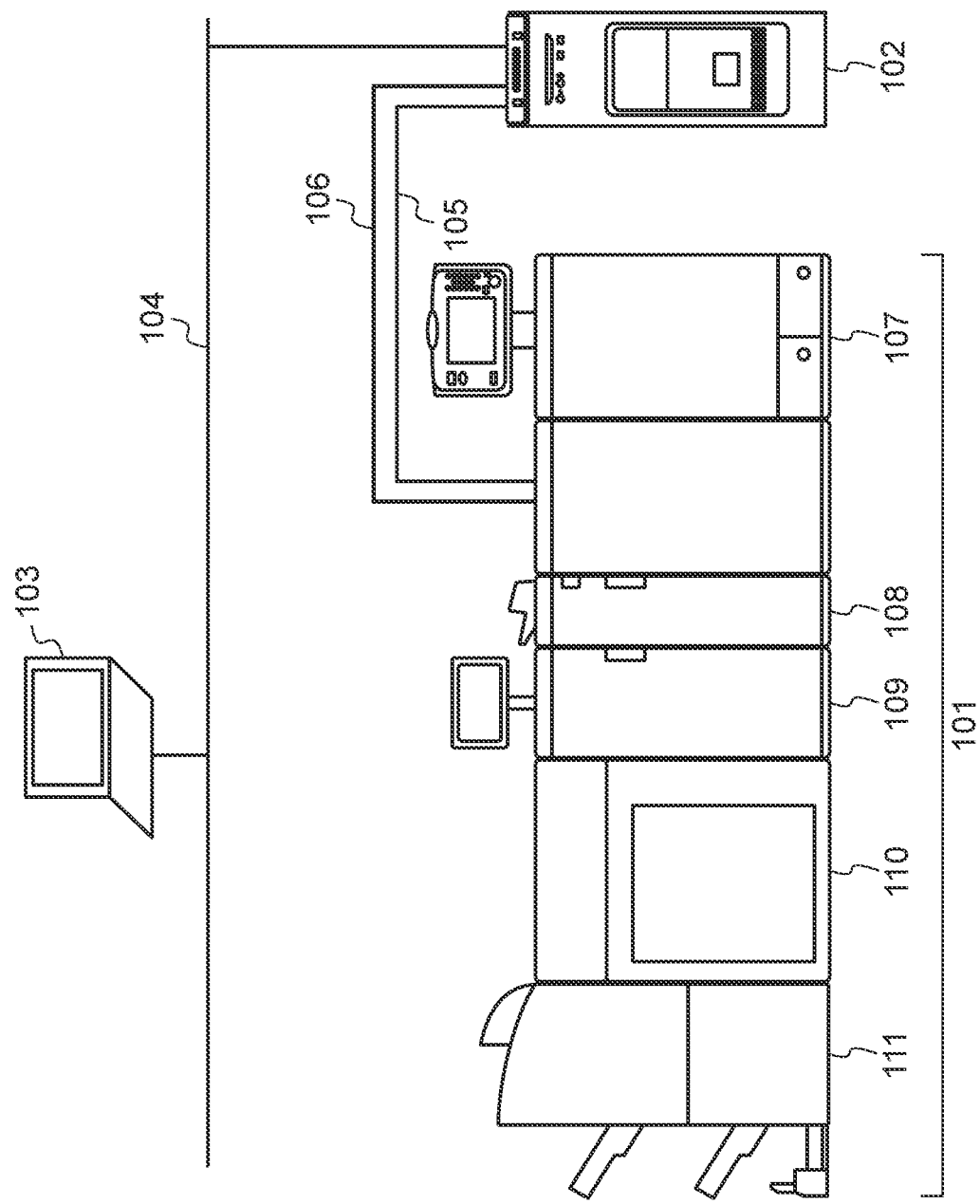
FIG. 1 is an example of an overall view of a hardware configuration of a printing system.

A first exemplary embodiment is to be described. FIG. 1 is an overall view of a hardware configuration of an image processing system according to the present exemplary embodiment. The image processing system includes an image forming apparatus 101 and an external controller 102. The image forming apparatus 101 and the external controller 102 are connected to each other in a communicable manner via an internal local area network (LAN) 105 and a video cable 106. The external controller 102 is connected to a personal computer (PC) 103 in a communicable manner via an external LAN 104. A print instruction is issued from the PC 103 to the external controller 102.

The PC 103 has a printer driver installed thereon, and the printer driver has a function of converting print data into a print description language that can be processed by the external controller 102. A user who performs printing can issue a print instruction from various applications via the printer driver. The printer driver transmits print data to the external controller 102 based on the print instruction from the user. Upon receiving the print instruction from the PC 103, the external controller 102 performs data analysis and rasterize processing on the print data, inputs the print data to the image forming apparatus 101, and issues a print instruction to the image forming apparatus 101. The external controller 102 inputs the print data and the rasterized image data via the internal LAN 105 and the video cable 106, respectively, to the image forming apparatus 101.

The image forming apparatus 101 is to be described. The image forming apparatus 101 is connected to a plurality of devices having different functions and is configured to be able to perform complicated print processing such as bookbinding.

A printing apparatus 107 uses toner to form an image on a sheet conveyed from a sheet feeding unit below the printing apparatus 107. A sheet is to be described here as an example, but a printing medium other than a sheet may be used. For example, the printing medium may be a sheet such as wrapping for a packaging container.

A configuration and an operation principle of the printing apparatus 107 are as follows. A light beam such as a laser beam modulated according to image data is reflected by a rotating polygonal mirror such as a polygon mirror, and a photosensitive drum is irradiated with the reflected light beam as scanning light.

An electrostatic latent image formed on the photosensitive drum by the laser beam is developed with toner, and the toner image is transferred to a sheet attached to a transfer drum. A series of image forming processes is sequentially executed using yellow (Y), magenta (M), cyan (C), and black (K) toners, and thus a full-color image is formed on the sheet. The sheet on the transfer drum on which the full-color image is formed is conveyed to a fixing device. The fixing device includes a roller and a belt, a heat source such as a halogen heater is built into the roller, and the toner of the toner image transferred to the sheet is melted and fixed to the sheet by heat and pressure. An inserter 108 is a device for inserting an insertion sheet. A sheet can be inserted from the inserter 108 at an arbitrary position into a sheet group printed and conveyed by the printing apparatus 107.

An inspection apparatus 109 is configured to compare image data generated by reading the image on the conveyed sheet (the printed material) with reference image data (correct answer image data or reference data) registered in advance, and thus to determine whether the printed material is normal. A central processing unit (CPU) 238 compares an image captured by an image capturing unit 240 with the reference image stored in a hard disk drive (HDD) 272 and determines whether the printed image is normal. Specifically, the CPU 238 extracts feature points from the reference image and a scanned image obtained from the image captured by the image capturing unit 240 and aligns the reference image and the scanned image based on the extracted feature points. In the aligned images, in a case where a difference between a pixel value (a luminance value) of an inspection target pixel in the scanned image and a pixel value (a luminance value) of a comparison target pixel in the correct answer image is smaller than or equal to a threshold value, the CPU 238 determines that the inspection target pixel has passed the inspection. The threshold value is different depending on inspection levels. The inspection proceeds for each of the reference images corresponding to scanned images.

In a case where the inspection is completed for all pixels, it is determined whether a total number of pixels having failed the inspection is smaller than or equal to an acceptable threshold value, and it is determined whether the scanned image is normal. In a case where the total number of pixels determined to be unacceptable is smaller than or equal to the acceptable threshold value, the CPU 238 determines that the scanned image is normal. In a case where the total number of pixels determined to be unacceptable exceeds the acceptable threshold value, the CPU 238 determines that the scanned image is not normal. The printed materials determined to be normal and the printed materials determined to be not normal are discharged separately from each other, for example, the normal printed material and the printed material with an error are discharged separately from each other.

According to the present exemplary embodiment, a function of determining whether a printed material is normal, which is performed by the inspection apparatus 109, is referred to as an inspection function, and the image forming apparatus 101 including the inspection apparatus 109 has an inspection function.

A large-capacity stacker 110 is a device on which a large amount of sheets can be stacked. A finisher 111 is a device that applies finishing processing to the conveyed sheet. The finisher 111 can perform finishing processing such as stapling, punching, and saddle stitch bookbinding based on a setting and discharges the sheet to a discharge tray.

A printing system illustrated in FIG. 1 has a configuration in which the image forming apparatus 101 is connected to the external controller 102, but the present disclosure is not limited to the configuration in which the external controller 102 is connected.

The image forming apparatus 101 may be connected to the external LAN 104, and print data that can be processed by the image forming apparatus 101 may be transmitted from the PC 103. In this case, the image forming apparatus 101 performs data analysis and rasterize processing and executes print processing.

Figure 2:
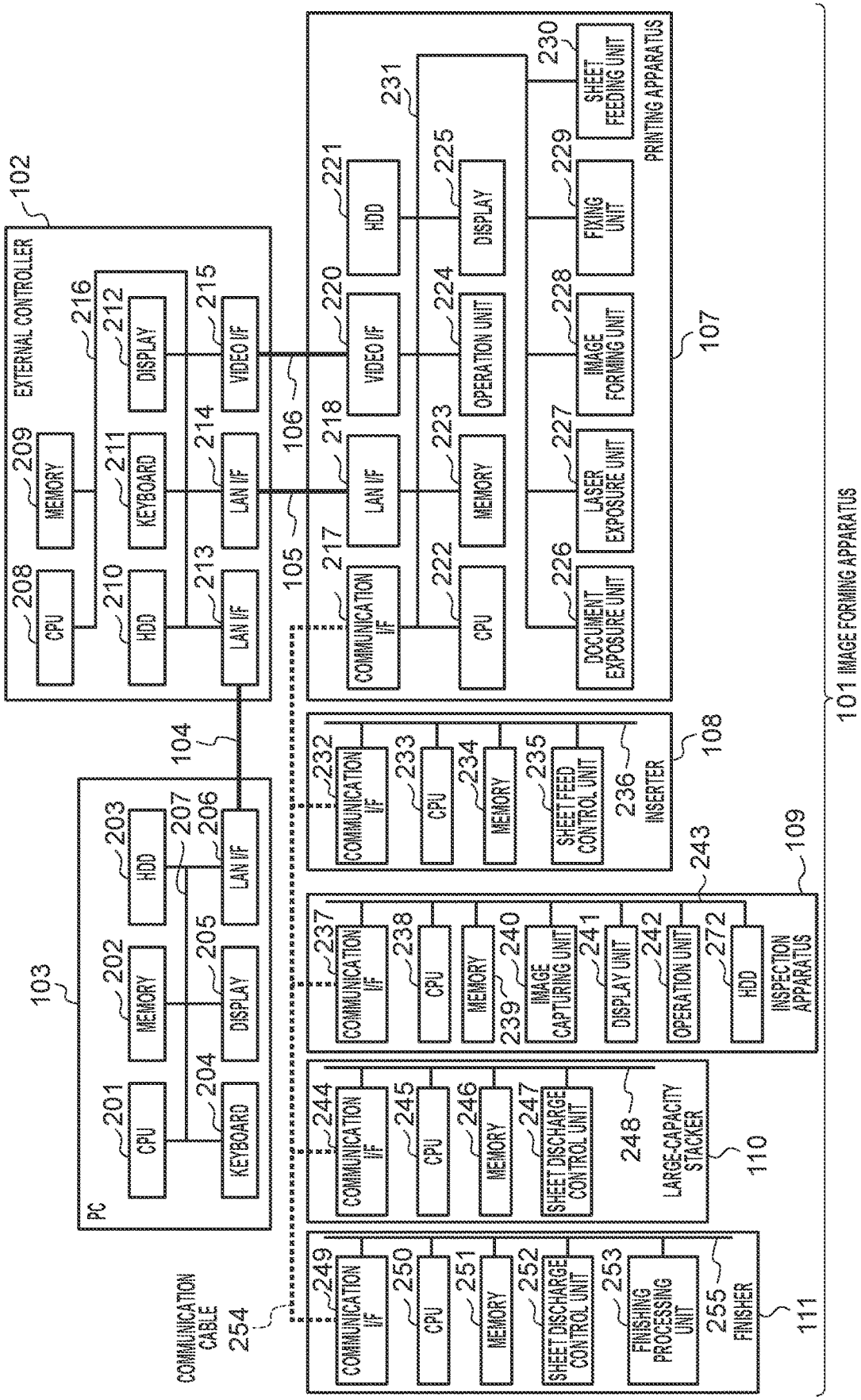
FIG. 2 is an example of a block diagram illustrating a system configuration of the printing system.

FIG. 2 is a block diagram illustrating a system configuration of the image forming apparatus 101, the external controller 102, and the PC 103.

A configuration of the printing apparatus 107 in the image forming apparatus 101 is to be described. The printing apparatus 107 in the image forming apparatus 101 includes a communication interface (I/F) 217, a LAN I/F 218, a video I/F 220, a HDD 221, a CPU 222, a memory 223, an operation unit 224, and a display 225. The printing apparatus 107 in the image forming apparatus 101 further includes a document exposure unit 226, a laser exposure unit 227, an image forming unit 228, a fixing unit 229, and a sheet feeding unit 230. The components are connected to each other via a system bus 231.

The communication I/F 217 is connected to the inserter 108, the inspection apparatus 109, the large-capacity stacker 110, and the finisher 111 via a communication cable 254 and performs communication for controlling each device.

The LAN I/F 218 is connected to the external controller 102 via the internal LAN 105 and communicates print data and the like.

The video I/F 220 is connected to the external controller 102 via the video cable 106 and communicates rasterized image data and the like.

The HDD 221 is a storage device in which a program and data are stored. The CPU 222 comprehensively controls image processing and printing based on the program stored in the HDD 221. The memory 223 stores a program and image data necessary for the CPU 222 to perform various types of processing and operates as a work area.

The operation unit 224 receives an input of various settings and an operation instruction from a user. The display 225 displays setting information about the image forming apparatus 101 and a processing status of a print job. The document exposure unit 226 performs processing of reading a document at the time of using a copy function and a scan function.

The document exposure unit 226 reads document data by capturing an image with a charge coupled device (CCD) camera while illuminating the sheet set by a user with an exposure lamp.

The laser exposure unit 227 is a device configured to perform primary charging and laser exposure in order to irradiate the photosensitive drum with the laser beam to transfer a toner image. The laser exposure unit 227 first performs primary charging for uniformly charging a surface of the photosensitive drum to a negative potential. A laser driver irradiates the photosensitive drum with the laser beam while adjusting a reflection angle with the polygon mirror. Accordingly, the negative charge in an irradiated area is neutralized, and an electrostatic latent image is formed. The image forming unit 228, which is a device for transferring toner to a sheet, includes a developing unit, a transfer unit, and a toner replenishing unit and transfers the toner on the photosensitive drum to the sheet.

The developing unit attaches negatively charged toner from a developing cylinder to the electrostatic latent image on the surface of the photosensitive drum to visualize the image. The transfer unit performs primary transfer in which a positive potential is applied to a primary transfer roller to transfer the toner from the surface of the photosensitive drum to a transfer belt and secondary transfer in which a positive potential is applied to a secondary transfer outer roller to transfer the toner on the transfer belt to the sheet. The fixing unit 229 is a device configured to melt and fix the toner on the sheet to the sheet by heat and pressure and including a heater, a fixing belt, and a pressure belt. The sheet feeding unit 230 is a device configured to feed the sheet and control a sheet feeding operation and a conveyance operation using a roller and various sensors.

A configuration of the inserter 108 in the image forming apparatus 101 is to be described. The inserter 108 in the image forming apparatus 101 includes a communication I/F 232, a CPU 233, a memory 234, and a sheet feed control unit 235, and the components are connected to each other via a system bus 236. The communication I/F 232 is connected to the printing apparatus 107 via the communication cable 254 and performs communication necessary for control. The CPU 233 performs various types of control necessary for feeding a sheet based on a control program stored in the memory 234. The memory 234 is a storage device in which the control program is stored. The sheet feed control unit 235 controls feed and conveyance of the sheet conveyed from the sheet feeding unit of the inserter 108 and the printing apparatus 107 while controlling the roller and the sensor based on an instruction from the CPU 222.

A configuration of the inspection apparatus 109 in the image forming apparatus 101 is to be described. The inspection apparatus 109 in the image forming apparatus 101 includes a communication I/F 237, the CPU 238, a memory 239, the image capturing unit 240, a display unit 241, an operation unit 242, and the HDD 272, and the components are connected to each other via a system bus 243. The communication I/F 237 is connected to the printing apparatus 107 via the communication cable 254 and performs communication necessary for control.

The reference image to be used for inspection is also received from the printing apparatus 107 via the communication cable 254 and the communication I/F 237 and stored in the HDD 272. The CPU 238 performs various types of control necessary for inspection based on a control program stored in the memory 239. The memory 239 is a storage device in which the control program is stored.

The image capturing unit 240 captures an image of the conveyed sheet based on an instruction from the CPU 238. The CPU 238, which may be configured to scan the conveyed sheet, compares the scanned image captured by the image capturing unit 240 with the reference image stored in the HDD 272 to determine whether the printed image (the printed material) is normal. The display unit 241 displays an inspection result, a setting screen, and the like. The operation unit 242 is operated by a user and receives instructions to change the setting of the inspection apparatus 109, to register the reference image, and the like. The HDD 272 stores the reference image. In a case where the HDD 272 is not provided, the HDD 221 stores the reference image, and the reference image may be read from the HDD 221 to the memory 239 and used in performing processing for determining whether the printed image is normal.

A configuration of the large-capacity stacker 110 in the image forming apparatus 101 is to be described. The large-capacity stacker 110 in the image forming apparatus 101 includes a communication I/F 244, a CPU 245, a memory 246, and a sheet discharge control unit 247, and the components are connected to each other via a system bus 248. The communication I/F 244 is connected to the printing apparatus 107 via the communication cable 254 and performs communication necessary for control. The CPU 245 performs various types of control necessary for discharging a sheet based on a control program stored in the memory 246. The memory 246 is a storage device in which the control program is stored. The sheet discharge control unit 247 performs control to convey the conveyed sheet to a stack tray, an escape tray, or a subsequent finisher 111 based on an instruction from the CPU 245.

A configuration of the finisher 111 in the image forming apparatus 101 is to be described. The finisher 111 in the image forming apparatus 101 includes a communication I/F 249, a CPU 250, a memory 251, a sheet discharge control unit 252, and a finishing processing unit 253. The components are connected to each other via a system bus 255. The communication I/F 249 is connected to the printing apparatus 107 via the communication cable 254 and performs communication necessary for control. The CPU 250 performs various types of control necessary for finishing processing and sheet discharge based on a control program stored in the memory 251. The memory 251 is a storage device in which the control program is stored. The sheet discharge control unit 252 controls conveyance and discharge of the sheet based on an instruction from the CPU 250. The finishing processing unit 253 controls finishing processing such as stapling, punching, and saddle stitch bookbinding based on an instruction from the CPU 250.

A configuration of the external controller 102 is to be described. The external controller 102 includes a CPU 208, the memory 209, a HDD 210, a keyboard 211, a display 212, a LAN I/F 213, a LAN I/F 214, and a video I/F 215, which are connected to each other via a system bus 216. The CPU 208 comprehensively executes processing such as reception of the print data from the PC 103, raster image processor (RIP) processing, and transmission of a print job to the image forming apparatus 101 based on a program and data stored in the HDD 210.

The memory 209 stores a program and data necessary for the CPU 208 to perform various types of processing and operates as a work area. The HDD 210 stores a program and data necessary for an operation such as print processing. The keyboard 211 is a device for inputting an operation instruction to the external controller 102. The display 212 displays information about an execution application and the like of the external controller 102 by video signals of a still image and a moving image. The LAN I/F 213 is connected to the PC 103 via the external LAN 104 and communicates a print instruction and the like. The LAN I/F 214 is connected to the image forming apparatus 101 via the internal LAN 105 and communicates a print job as the print instruction. The video I/F 215 is connected to the image forming apparatus 101 via the video cable 106 and communicates rasterized image data and the like.

A configuration of the PC 103 is to be described. The PC 103 includes a CPU 201, a memory 202, a HDD 203, a keyboard 204, a display 205, and a LAN I/F 206, which are connected to each other via a system bus 207. The CPU 201 generates print data and gives the print instruction based on a document processing program and the like stored in the HDD 203.

The CPU 201 comprehensively controls each device connected to the system bus 207. The memory 202 stores a program and data necessary for the CPU 201 to perform various types of processing and operates as a work area. The HDD 203 stores a program and data necessary for an operation such as print processing. The keyboard 204 is a device for inputting an operation instruction to the PC 103. The display 205 displays information about an execution application and the like of the PC 103 by video signals of a still image and a moving image. The LAN I/F 206 is connected to the external LAN 104 and communicates the print instruction and the like.

In the above descriptions, the external controller 102 and the image forming apparatus 101 are connected to the internal LAN 105 and the video cable 106. Any configuration, however, may be used as long as data necessary for printing can be transmitted and received, and for example, a connection configuration with only a video cable may be used. Each of the memories 202, 209, 223, 234, 239, 246, and 251 may be a storage device for storing data and a program. For example, a volatile random access memory (RAM), a non-volatile read-only memory (ROM), an internal HDD, an external HDD, and a Universal Serial Bus (USB) memory may be used instead.

Figure 3:
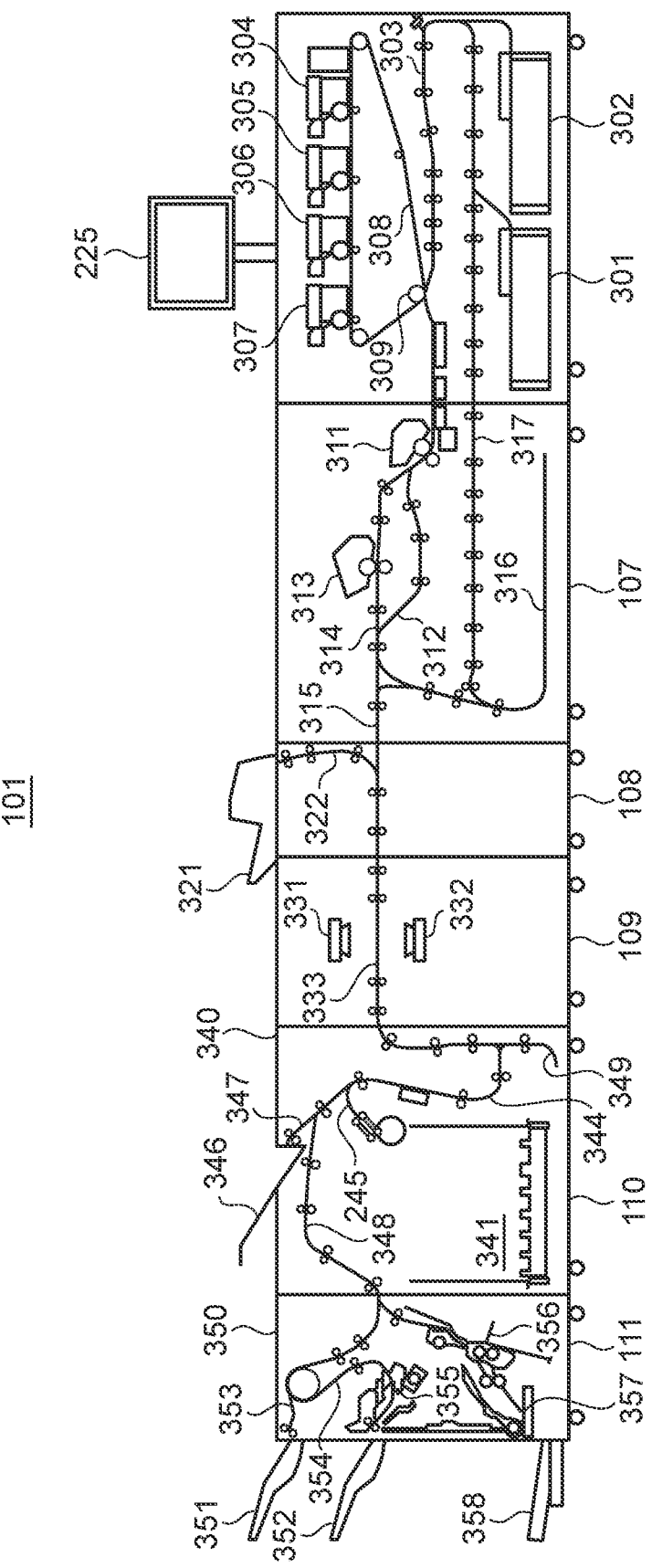
FIG. 3 is an example of a schematic diagram illustrating a mechanical cross-sectional view of an image forming apparatus.

FIG. 3 is a mechanical cross-sectional view of the image forming apparatus 101. The printing apparatus 107 forms an image to be printed on a sheet. Sheet feed decks 301 and 302 can store various sheets. Information about the sheet (a sheet size and a sheet type) stored in each of the sheet feed decks can be set from the operation unit 224 of the printing apparatus 107.

In each sheet feed deck, only an uppermost sheet can be separated from the stored sheets and conveyed to a sheet conveyance path 303. Development stations 304 to 307 form toner images using Y, M, C, and K colored toners to form color images, respectively. The formed toner image is primarily transferred to an intermediate transfer belt 308. The intermediate transfer belt 308 rotates clockwise in FIG. 3, and the toner image is transferred to the sheet conveyed from the sheet conveyance path 303 at a secondary transfer position 309.

The display 225 displays information about a printing status and a setting of the image forming apparatus 101. A fixing unit 311 fixes the toner image to the sheet. The fixing unit 311 includes a pressure roller and a heating roller. As the sheet passes between the rollers, the toner is melted and pressed, and thus the toner image is fixed to the sheet. After passing through the fixing unit 311, the sheet is conveyed through a sheet conveyance path 312 to a sheet conveyance path 315.

In a case where melting and pressing are further required for fixing the toner image depending on the type of the sheet, the sheet is conveyed to a second fixing unit 313 using an upper sheet conveyance path after the sheet passes through the fixing unit 311. The sheet is additionally melted and pressed in the second fixing unit 313, and then conveyed through a sheet conveyance path 314 to the sheet conveyance path 315. In a case where an image forming mode is a two-sided mode, the sheet is conveyed to and reversed in a sheet reversing path 316. Then the sheet is conveyed to a two-sided conveyance path 317, and an image is transferred to a second surface of the sheet at the secondary transfer position 309.

The inserter 108 inserts an insertion sheet. The inserter 108 includes an inserter tray 321 and conveys the sheet fed to the inserter tray 321 into the conveyance path through a sheet conveyance path 322. Accordingly, the sheet can be inserted at an arbitrary position into a series of sheet groups conveyed from the printing apparatus 107 and conveyed to a subsequent apparatus.

After the sheet passes through the inserter 108, the sheet is conveyed to the inspection apparatus 109. In the inspection apparatus 109, cameras 331 and 332 are arranged facing each other. The camera 331 is used for reading a top surface of the sheet, and the camera 332 is used for reading a bottom surface of the sheet. The inspection apparatus 109 can read images on the sheet by scanning the printed material using the cameras 331 and 332 at the timing when the sheet conveyed to the sheet conveyance path 333 reaches a predetermined position and determine whether the scanned image is normal. The display unit 241 displays an inspection result obtained by the inspection apparatus 109 and the like.

The large-capacity stacker 110 can stack a large amount of sheets.

The large-capacity stacker 110 includes a stack tray 341 as a tray for stacking the sheet (the printed material) determined as normal by the inspection apparatus 109. After passing through the inspection apparatus 109, the sheet enters the large-capacity stacker 110 through a sheet conveyance path 344. The sheet is stacked on the stack tray 341 via the sheet conveyance path 344 and a sheet conveyance path 345.

A stacker 340 includes an escape tray 346 as a discharge tray. The escape tray 346 is a discharge tray used to discharge the sheet (the printed material) determined to have an error by the inspection apparatus 109. In a case where the sheet is output to the escape tray 346, the sheet is conveyed from the sheet conveyance path 344 to the escape tray 346 via a sheet conveyance path 347. In a case where the sheet is conveyed to a post-processing apparatus in a subsequent stage of the large-capacity stacker 110, the sheet is conveyed via a sheet conveyance path 348. A reversing unit 349 is used to reverse the sheet. The reversing unit 349 is used in a case where the sheet is stacked on the stack tray 341.

The sheet is reversed once in the reversing unit 349 in a case where the sheet is stacked on the stack tray 341 so that an orientation of the input sheet and an orientation of the sheet at the time of output are the same. In a case where the sheet is conveyed to the escape tray 346 or the subsequent post-processing apparatus, the sheet is discharged as it is without being flipped when the sheet is stacked, so that the reversing operation is not performed in the reversing unit 349.

The finisher 111 is a device configured to apply finishing processing to the conveyed sheet based on the function specified by a user. Specifically, the finisher 111 has finishing functions such as stapling (one point or two point binding), punching (two holes or three holes), and saddle stitch binding. The finisher 111 includes discharge trays 351 and 352. The sheet is output to the discharge tray 351 via a sheet conveyance path 353. The finishing processing such as stapling cannot be performed in the sheet conveyance path 353.

In a case where the finishing processing such as stapling is performed, the finishing function specified by a user is executed in a processing unit 355 via a sheet conveyance path 354, and the sheet is output to the discharge tray 352. The discharge trays 351 and 352 can be independently raised and lowered, and it is also possible to lower the discharge tray 351 to stack the sheet on which the finishing processing has been performed in the processing unit 355 thereon. In a case where saddle stitch bookbinding is specified, a saddle stitch processing unit 356 performs stapling processing on the center of the sheet, then folds the sheet in half, and outputs the folded sheet to a saddle stitch bookbinding tray 358 via a sheet conveyance path 357. The saddle stitch bookbinding tray 358 has a belt conveyor configuration and conveys a saddle-stitch bookbinding bundle stacked thereon to the left side in FIG. 3.

Figure 4A:
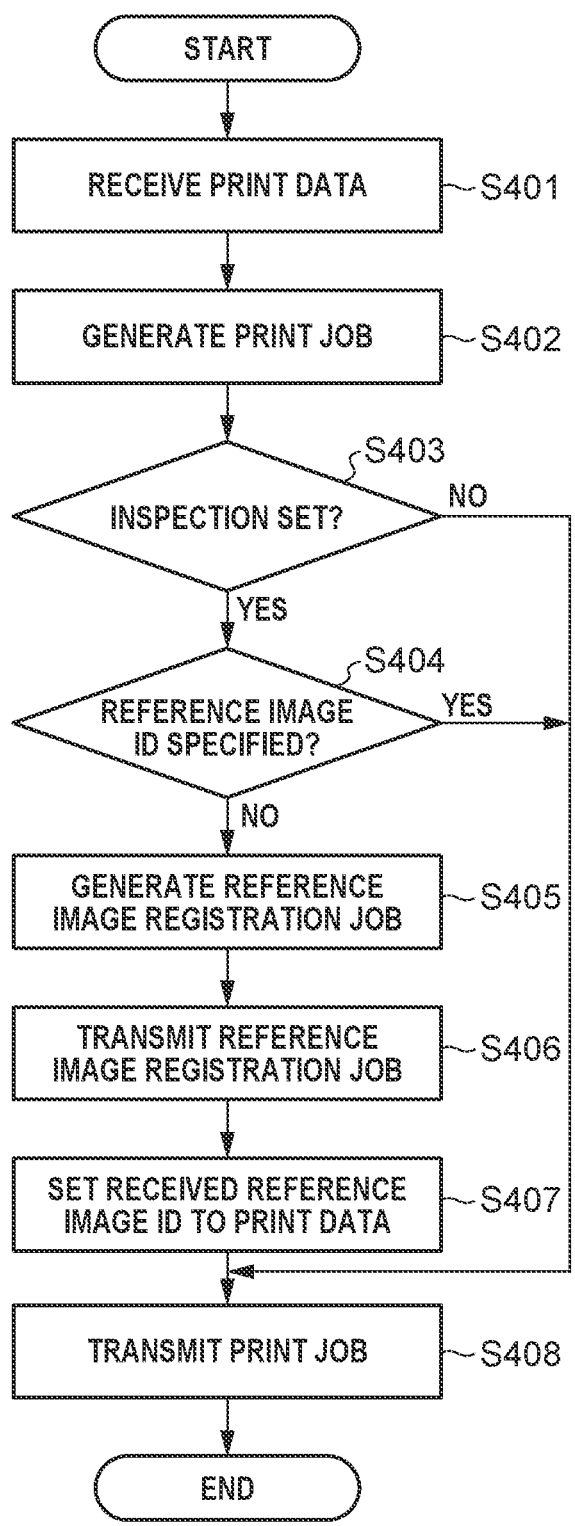
FIGS. 4A and 4B are examples of flowcharts illustrating a series of processes of inspection determination of a print job by an external controller.
Figure 4B:
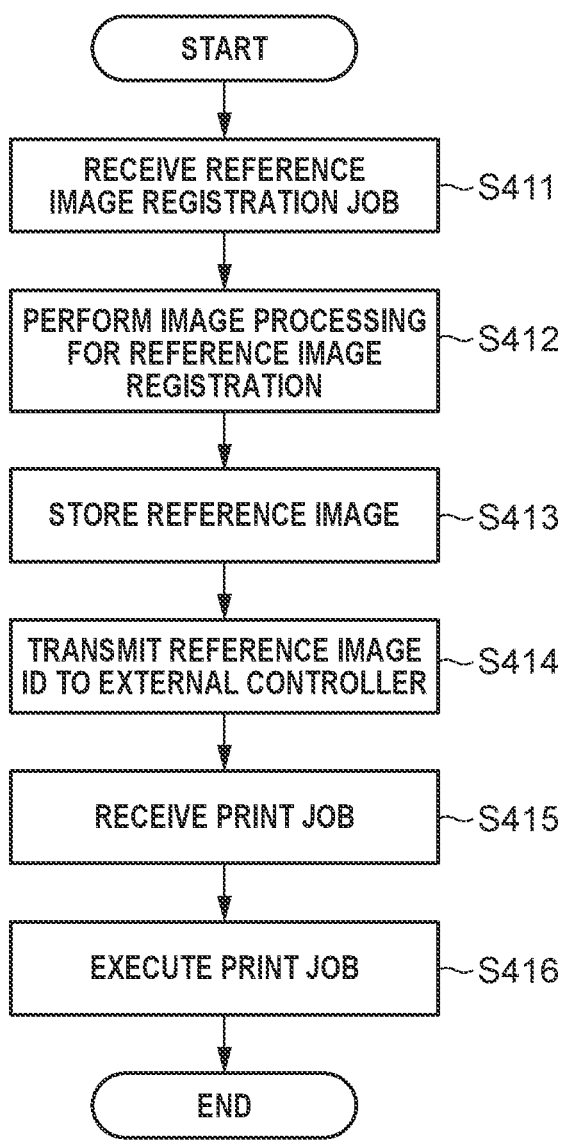

FIG. 4A is a flowchart illustrating a series of processes of executing a print job by the external controller 102 according to the present exemplary embodiment. FIG. 4B is a flowchart illustrating a series of processes of executing a print job by the image forming apparatus 101 according to the present exemplary embodiment. Steps S401 to S408 and steps S411 to S417 in FIGS. 4A and 4B are steps in the processing.

In step S401, the external controller 102 receives print data from the PC 103.

In step S402, the external controller 102 acquires an image from the print data received in step S401 and generates a print job for performing printing in the image forming apparatus 101. In generating the job, job settings are performed for RIP processing corresponding to an output form and for finishing processing to be executed by the image forming apparatus 101.

In step S403, the external controller 102 determines whether an inspection is set in the print data received in step S401. In a case where the inspection is set (YES in step S403), the processing proceeds to step S404, whereas in a case where the inspection is not set (NO in step S403), the processing proceeds to step S408.

In step S404, the external controller 102 determines whether reference image identification (ID) for inspection is set in the print data setting received in step S401. In a case where the reference image ID is set, it indicates that the reference image for inspection is already registered in the HDD 272 of the inspection apparatus 109, and registration of the reference image is not necessary. According to the present exemplary embodiment, whether the reference image needs to be registered is determined based on whether the reference image ID is set. However, it is also possible to add a parameter such as automatic reference image generation for explicitly generating the reference image automatically during execution of the print job and performing inspection using the generated reference image. In step S404, in a case where the reference image ID is specified (YES in step S404), the processing proceeds to step S408 since it is not necessary to register the reference image, whereas in a case where the reference image ID is not specified (NO in step S404), the processing proceeds to step S405.

In step S405, the external controller 102 generates a reference image registration job to be transmitted to the image forming apparatus 101.

Actually, the external controller 102 uses the image on which the RIP processing has been performed in step S402 as the image for the reference image registration job.

In step S406, the external controller 102 transmits the reference image registration job to the image forming apparatus 101.

The series of processes of processing in the image forming apparatus 101 after the reference image registration job is transmitted to the image forming apparatus 101 from the external controller 102 in step S406 is to be described.

In step S411, the image forming apparatus 101 receives the reference image registration job, and then in step S412, the image forming apparatus 101 performs image processing for the reference image registration.

Subsequently, in step S413, the image forming apparatus 101 stores the reference image in the HDD 272 of the inspection apparatus 109 and issues the reference image ID for specifying the registered reference image.

Subsequently, in step S414, the image forming apparatus 101 transmits the issued reference image ID to the external controller 102.

According to the present exemplary embodiment, one reference image ID is issued to a series of reference image groups of the reference image registration job, but one ID may be additionally issued to one image. The reference image ID does not necessarily have to be an ID number and can be any identification information that can identify the reference image.

The description returns to the series of processes after the reference image ID is transmitted from the image forming apparatus 101 to the external controller 102 in FIG. 4A.

In step S406, the external controller 102 receives the reference image ID from the image forming apparatus 101 when the reference image registration job is completed. In step S407, the external controller 102 sets the reference image ID received in step S406 to the print data.

According to the present exemplary embodiment, the external controller 102 stores data indicating whether the reference image has been generated this time in the print data. In step S408, the external controller 102 transmits the print job to the image forming apparatus 101.

In step S415, the print job is transmitted from the external controller 102 to the image forming apparatus 101, and then in step S416, the image forming apparatus 101 executes the print job.

According to the present exemplary embodiment, the example is described that the print job is started after the registration of the reference image is completed. However, in step S406, the reference image ID may be received from the image forming apparatus 101 at the start of registration of the reference image registration job, and the reference image registration job and the print job may be operated in parallel.

According to the present exemplary embodiment, the external controller 102 divides the job into the reference image registration job and the print job and transmits the jobs to the image forming apparatus 101, but the image forming apparatus 101 may divide the job into the reference image registration job and the print job.

Figure 5:
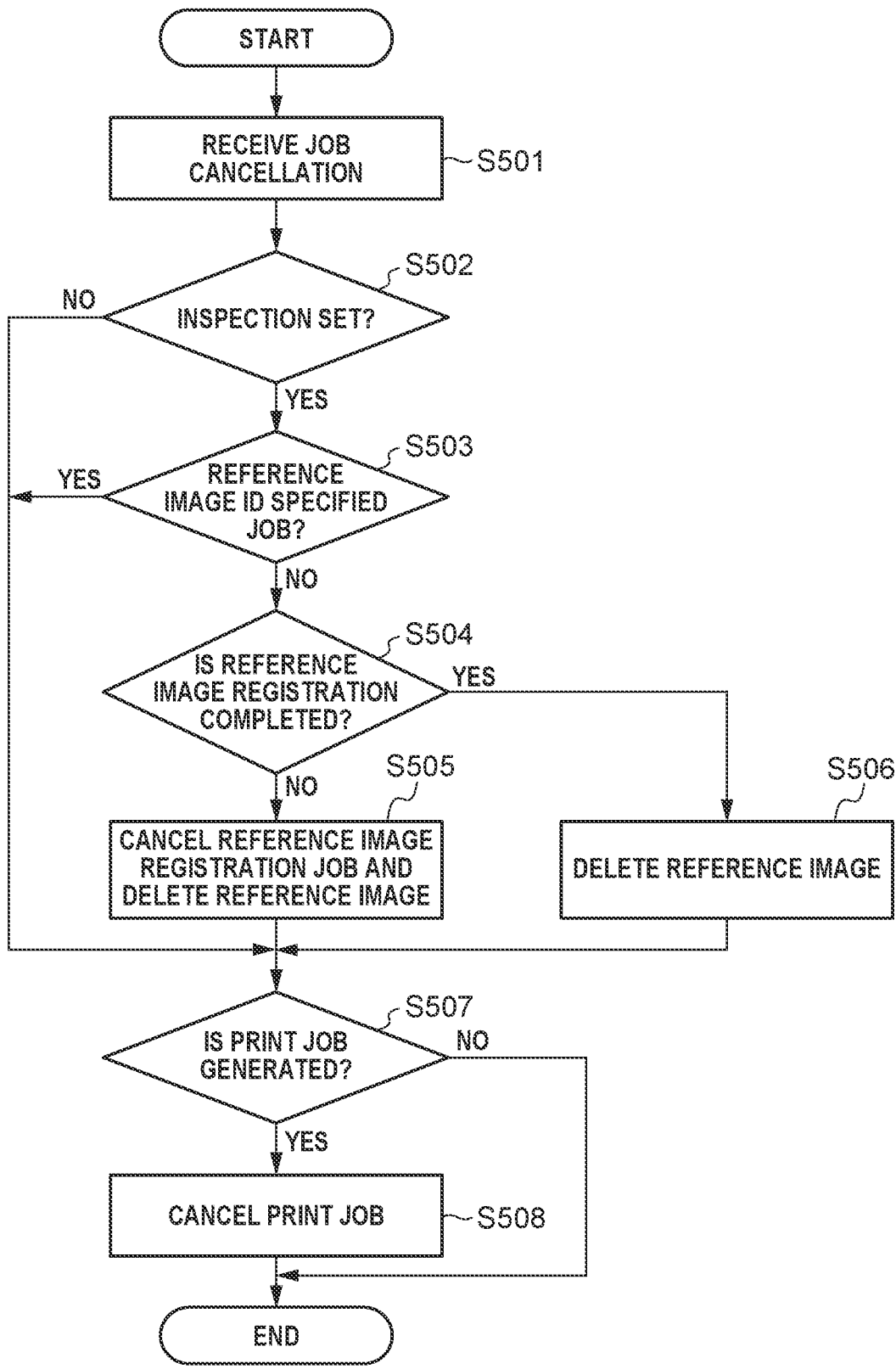
FIG. 5 is an example of a flowchart illustrating a series of processes of print job cancellation by the external controller.

FIG. 5 is a flowchart illustrating a series of processes of print job cancellation by the external controller 102 according to the present exemplary embodiment. Steps S501 to S508 in FIG. 5 are steps in the processing.

In step S501, the external controller 102 receives an instruction to cancel the print job from the PC 103 or by an operation on the keyboard 211 of the external controller 102.

The job cancellation instruction from a user may be received from the operation unit 224 and the display 225 of the image forming apparatus 101. In this case, upon receiving the job cancellation instruction, the image forming apparatus 101 suspends the job and notifies the external controller 102 of the job cancellation.

In step S502, the external controller 102 determines whether the inspection is set in the print job to which job cancellation is instructed. In a case where the inspection is set (YES in step S502), the processing proceeds to step S503, whereas in a case where the inspection is not set (NO in step S502), the processing proceeds to step S507.

In step S503, the external controller 102 determines whether the reference image ID is specified in the determination in step S404.

In a case where the reference image ID is explicitly specified in the job (YES in step S503), the reference image registration processing in steps S405 and S406 is not operated, and there is no state that the reference image registration is in progress. Thus, the processing proceeds to step S507. In a case where the reference image ID is not explicitly specified in the job (NO in step S503), the processing proceeds to step S504.

In step S504, the external controller 102 determines whether the reference image registration job, namely the processing in steps S405 and S406 in FIG. 4A, is completed. In a case where the processing is completed (YES in step S504), the processing proceeds to step S506, whereas in a case where the processing is not completed (NO in step S504), the processing proceeds to step S505.

In step S505, the external controller 102 instructs the image forming apparatus 101 to cancel the reference image registration job and to delete the reference image, which is registered halfway in the HDD 272 of the inspection apparatus 109.

In step S506, because the reference image registration is already completed, the external controller 102 instructs the image forming apparatus 101 to delete the reference image in the HDD 272 of the inspection apparatus 109.

In step S507, the external controller 102 determines whether the print job is generated. In a case where the print job is generated (YES in step S507), the processing proceeds to step S508, whereas in a case where the print job is not generated (NO in step S507), the processing is terminated.

In step S508, the external controller 102 instructs the image forming apparatus 101 to cancel the print job, and the image forming apparatus 101 cancels the print job being executed.

According to the present exemplary embodiment, the external controller 102 determines the cancellation of the print job in step S508 and instructs the image forming apparatus 101 to cancel the print job, but the image forming apparatus 101 may determine the cancellation of the print job and cancel the print job. For example, in a case where the operation unit 224 of the image forming apparatus 101 receives the job cancellation instruction, the image forming apparatus 101 proceeds with cancellation processing of the print job in a case where the print job is received.

In a case where the image forming apparatus 101 proceeds with cancellation processing of the print job, the external controller 102 does not issue the job cancellation instruction in step S508 in FIG. 5.

In a case where the reference image is automatically registered in the inspection apparatus, printed and inspected as it is by execution of the processing described above, a user is not very aware of the reference image registration, so that the reference images are accumulated in the inspection apparatus without user's awareness and increase the possibility that the reference images weigh heavily on a storage capacity of the inspection apparatus. Particularly, the present exemplary embodiment solves an issue that, in a case where an unnecessary reference image remains in the inspection apparatus when an inspection print job is canceled, the remained reference image further weighs on the storage capacity of the inspection apparatus, and the user has to determine which reference image is unnecessary and to be deleted, which result in unnecessary work.

Accordingly, the present exemplary embodiment can provide the mechanism that enables a user to use the storage area of the inspection device without having to consciously delete the reference image at a time of canceling a job and the like in the configuration in which the reference image is automatically registered in the inspection apparatus and printed and inspected as it is.

A second exemplary embodiment is to be described. According to the first exemplary embodiment, regarding a job in which the reference image is automatically registered in the inspection apparatus and printed and inspected as it is (hereinbelow, referred to as an automatic inspection job), the reference image is always deleted when the print job is canceled to prevent the storage capacity of the inspection apparatus from becoming full. However, there is a case where a user wants to cancel a print job and immediately input the canceled job again, such as a case where the user inputs the print job by making a mistake in a print setting. In a case where the user inputs a job again, such as a case where the user resets the number of copies and performs printing, it may not be necessary to perform RIP processing again. In this case, printing efficiency may be lowered by generating and registering the reference image again. Thus, according to the second exemplary embodiment, it is set in advance whether to delete a reference image when an automatic inspection job is canceled, and it is determined whether to delete or leave the reference image based on the setting.

Figure 6:
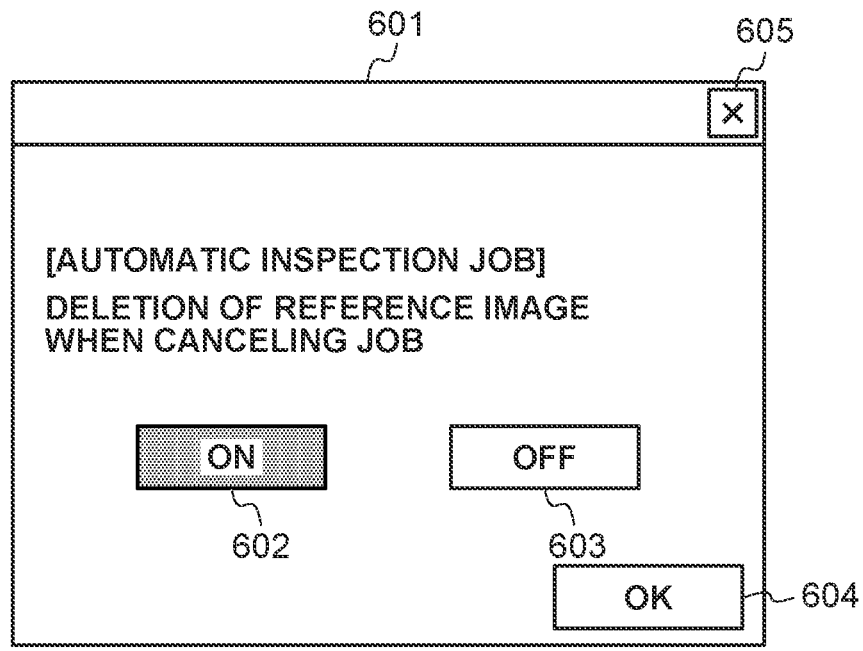
FIG. 6 illustrates an example of a reference image deletion setting window of an automatic inspection job.

FIG. 6 illustrates a setting screen for setting either deleting a reference image of an automatic inspection job or leaving a reference image of an automatic inspection job according to the present exemplary embodiment. The screen is a setting screen 601 for performing a setting on the external controller 102 in advance.

The setting screen 601 is used to set either deleting the reference image or leaving the reference image when the automatic inspection job is canceled, and the setting screen 601 is displayed on the display 205 of the PC 103 by the CPU 201. The setting screen 601 may be controlled to be displayed on the display 225 of the external controller 102 by the CPU 222. The setting selected on the setting screen 601 is stored in the HDD 210 of the external controller 102. A button 602 is an "ON" key, which is selected in a case where the reference image is to be deleted when the automatic inspection job is canceled.

A button 603 is an "OFF" key, which is selected in a case where the reference image is left when the automatic inspection job is canceled. Display of the button 602 and display of the button 603 are toggled, and the selected key is reversely displayed. In FIG. 6, the "ON" key 602 is selected. An "OK" key 604 is used to store a content set on the setting screen 601 in the HDD 210 and close the window. In a case where a user does not want to store the content set in the setting screen 601, the user presses a key 605 to close the screen.

Figure 7:
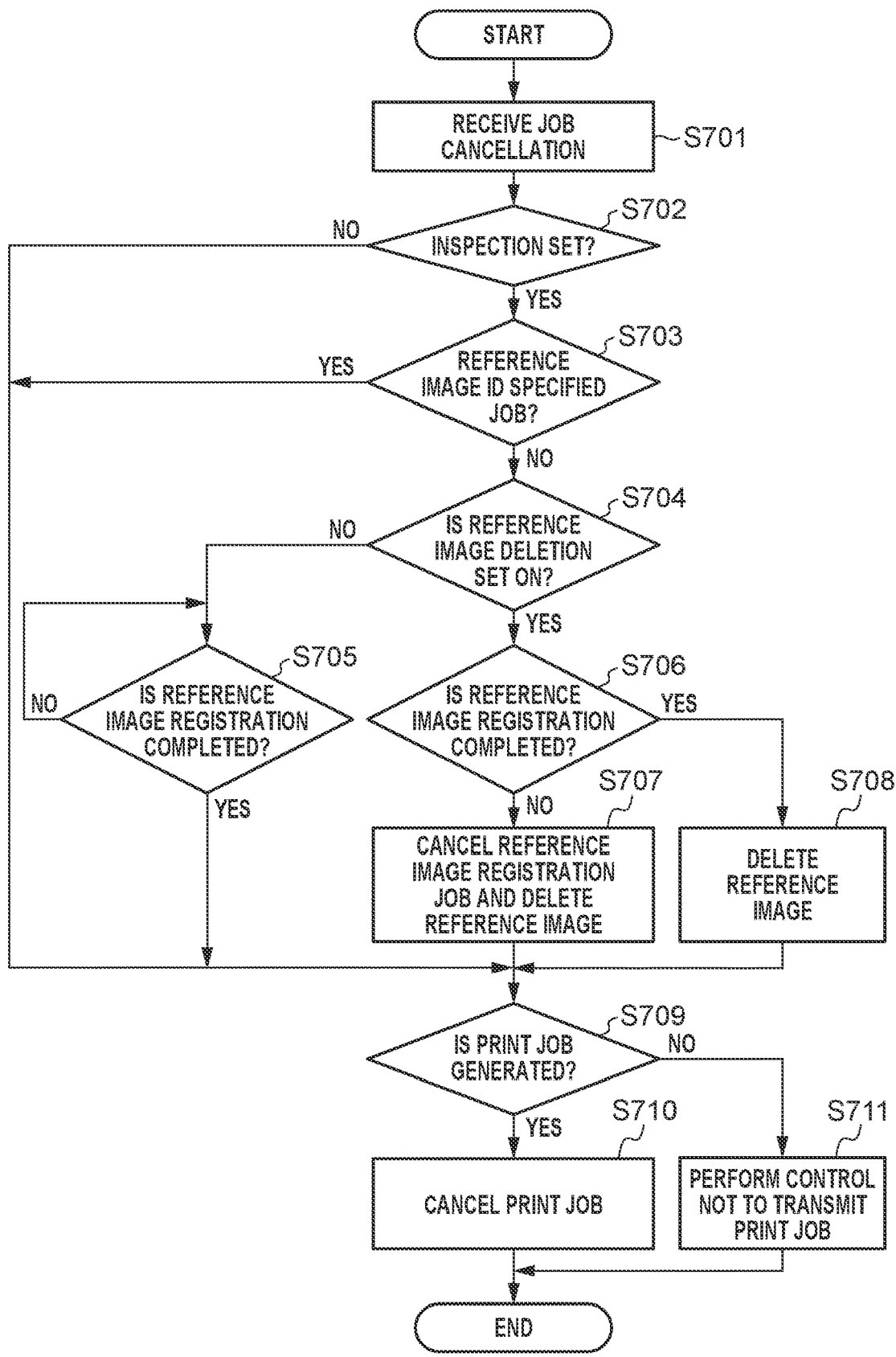
FIG. 7 is an example of a flowchart illustrating a series of processes of print job cancellation by the external controller in a case where either deleting or leaving a reference image can be selected.

FIG. 7 is a flowchart illustrating a series of processes of print job cancellation by the external controller 102 in a case where either deleting or leaving the reference image can be selected according to the present exemplary embodiment. Steps S701 to S711 in FIG. 7 are steps in the processing.

In step S701, the external controller 102 receives an instruction to cancel the print job from the PC 103 or by an operation on the keyboard 211 of the external controller 102. For example, it is assumed that a user operates the keyboard 211 and selects one job. A job ID corresponding to the selected job is identified and added to the job cancellation instruction. The user can select a plurality of jobs and cancel the plurality of jobs at once.

As a modification, the job cancellation instruction is received by the external controller 102. Alternatively, a job to be canceled is selected from among a plurality of jobs by specifying the operation unit 224. The user can select a plurality of jobs and cancel the plurality of jobs at once. The job ID corresponding to the selected job is identified and added to the job cancellation instruction. The job cancellation instruction is transmitted to and received by the external controller 102 in step S701.

In step S702, the external controller 102 determines whether the inspection is set in the print job to which job cancellation is instructed. In a case where the inspection is set (YES in step S702), the processing proceeds to step S703, whereas in a case where the inspection is not set (NO in step S702), the processing proceeds to step S709.

In step S703, the external controller 102 determines whether the reference image ID is specified in the determination in step S404.

In a case where the reference image ID is explicitly specified in the job (YES in step S703), the job is not the automatic inspection job, so that there is no need to delete the reference image, and the processing proceeds to step S709. In a case where the reference image ID is not explicitly specified in the job (NO in step S703), the job is the automatic inspection job, and the processing proceeds to step S704.

In step S704, the external controller 102 determines the reference image deletion setting, which is set in advance on a window in the setting screen 601. In a case where the reference image deletion is set to ON (YES in step S704), the processing proceeds to step S706, whereas in a case where the reference image deletion is set to OFF (NO in step S704), the processing proceeds to step S705.

In step S705, the external controller 102 determines whether the reference image registration job, namely the processing in steps S405 and S406 in FIG. 4A, is completed. In a case where the processing is completed (YES in step S705), the processing proceeds to step S709, whereas in a case where the processing is not completed (NO in step S705), the processing returns to step S705. By the processing, it is possible to wait until the registration of the reference image is completed and leave the reference image.

In step S706, the external controller 102 determines whether the reference image registration job is completed as in step S705. In a case where the processing is completed (YES in step S706), the processing proceeds to step S708, whereas in a case where the processing is not completed (NO in step S706), the processing proceeds to step S707.

In step S707, the external controller 102 instructs the image forming apparatus 101 to cancel the reference image registration job and to delete the reference image, which is registered halfway in the HDD 272 of the inspection apparatus 109.

In step S708, because the reference image registration is already completed, the external controller 102 instructs the image forming apparatus 101 to delete the reference image in the HDD 272 of the inspection apparatus 109.

In step S709, the external controller 102 determines whether the print job is generated. In a case where the print job is generated (YES in step S709), the processing proceeds to step S710, whereas in a case where the print job is not generated (NO in step S709), the processing proceeds to step S711.

In step S710, the external controller 102 instructs the image forming apparatus 101 to cancel the print job, and the image forming apparatus 101 cancels the print job being printed.

In step S711, the external controller 102 performs control not to transmit the print job to the image forming apparatus 101. In step S711, the external controller 102 may perform control not to generate a print job. In a case where a plurality of jobs is specified as the jobs to be canceled, a plurality of reference images corresponding to the plurality of jobs can be deleted.

According to the present exemplary embodiment, it is possible to select either deleting or leaving the reference image when the automatic inspection job is to be canceled by performing the processing described above.

A third exemplary embodiment is to be described. According to the second exemplary embodiment, either deleting or leaving the reference image can be set in advance when the automatic inspection job is to be canceled. However, whether it is better to delete the reference image for each job may differ depending on a cancellation status. For example, in a case where the number of copies is changed as described as an example in the second exemplary embodiment, it is not necessary to perform RIP processing again, and the reference image can be reused, so that it is more efficient to leave and specify the reference image, and input the print job again. However, for example, in a case where a user forgets to set a page layout function of reducing images and laying out a plurality of pages on one page, it is necessary to perform RIP processing again, so the reference image cannot be reused. Thus, in a case where it is necessary to perform the RIP processing again, it is desirable to delete the reference image. For this reason, according to the third exemplary embodiment, in a case where an automatic inspection job is cancelled, a deletion setting window for the reference image is displayed to enable a user to select either deleting or leaving the reference image for each job.

Figure 8:
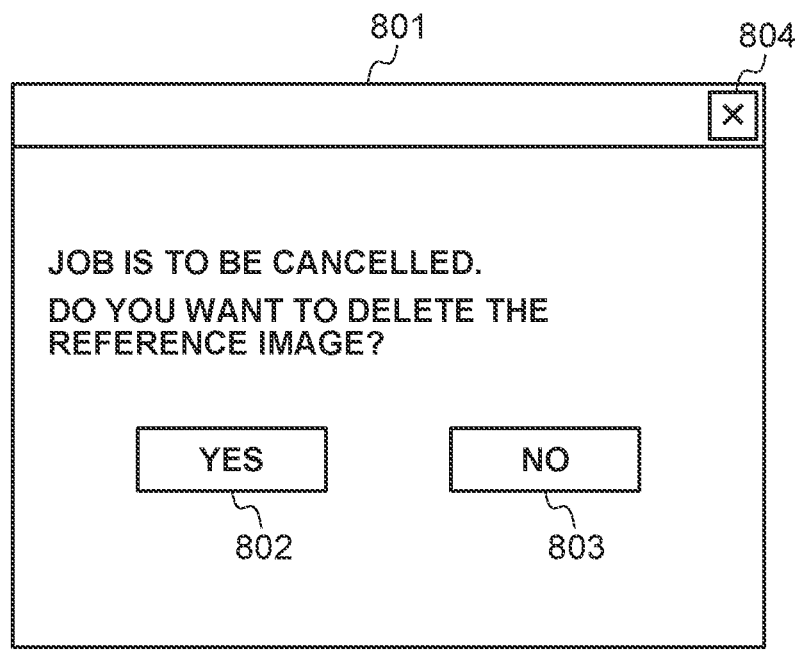
FIG. 8 illustrates an example of a reference image deletion selection window in cancelling an automatic inspection job.

FIG. 8 illustrates a selection screen for selecting either deleting or leaving the reference image when the automatic inspection job is to be canceled according to the present exemplary embodiment.

A screen 801 is a selection screen (a selection window) for selecting either deleting or leaving the reference image when the automatic inspection job is to be canceled, and the screen 801 is displayed on the display 205 of the PC 103 by the CPU 201 when the print job is to be canceled. The screen 801 may be controlled to be displayed on the display 225 of the external controller 102 by the CPU 222.

The screen 801 is displayed only in a case where the automatic inspection job is canceled, and the screen 801 is not displayed in a case where the print job that is not inspected or in which the reference image ID is explicitly specified is to be canceled. A button 802 is a "YES" key, which is selected in a case where the reference image is deleted. In a case where the button 802 is selected, the screen 801 is closed, the reference image is deleted, and the print job is canceled. A "NO" key 803 is selected in a case where the reference image is to be left. If the "NO" key 803 is selected, the screen 801 is closed, and the print job is canceled. At this time, in a case where the reference image registration is in progress, the job is canceled after the reference image registration is completed. In a case where the job cancellation is cancelled, a key 804 is pressed to close the screen 801. An instruction input on the screen 801 is specified in data of the job cancellation received in step S701, and is determined in step S704 in FIG. 7.

According to the present exemplary embodiment, deletion of the reference image can be selected for each job when the automatic inspection job is to be canceled, by performing the processing described above, and the automatic inspection job can be more flexibly and efficiently operated. Of course, it is possible to set in advance either displaying or not displaying the screen 801 in a case where the automatic inspection job is to be canceled. As a modification, in a case where cancellation of a plurality of jobs is instructed, an input unit may be provided as a screen on which an instruction to delete a reference image of a job A and not to delete a reference image of a job B can be input. Alternatively, in a case where a job is to be canceled, a device setting may be set so that the reference image of the canceled job is uniformly deleted.

According to the present exemplary embodiment, the external controller 102 is described as an example of a controller that processes a print job. The image forming apparatus 101 is described as an example of an image forming apparatus capable of communicating with the external controller 102. The method for controlling the system including these apparatuses is described. Specifically, in a case where the external controller 102 receives a job, the external controller 102 controls execution of inspection processing based on a reference image registered in association with the job. The inspection processing is instructed by the external controller 102 and performed by the inspection apparatus 109 as described above.

The external controller 102 receives and accepts a cancellation instruction for the job that is received and started. Then, the external controller 102 deletes the registered reference image for the inspection processing. The processing is executed by the CPU 222 based on the control by the external controller 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-193806, filed Nov. 30, 2021, which is hereby incorporated by reference herein in its entirety.

What is claimed is:

1. An image forming apparatus configured to communicate with an external controller configured to generate a job, the image forming apparatus comprising:
one or more controllers having one or more processors and one or more memories, the one or more controllers configured to:
acquire an image from a first job upon receiving the first job from the external controller and register a reference image generated from the image;
execute inspection processing for inspecting a printed image acquired from a second job based on the printed image and the reference image registered, upon receiving the second job from the external controller; and
suspend the inspection processing and delete the reference image registered upon receiving a cancellation instruction to cancel the second job from the external controller.

2. The image forming apparatus according to claim 1, wherein the one or more controllers are configured to perform control not to execute the inspection processing upon receiving the cancellation instruction to cancel the second job.

3. The image forming apparatus according to claim 1, wherein the first job is a reference image registration job to register a reference image.

4. The image forming apparatus according to claim 1, wherein the second job is an inspection job for executing the inspection processing.

5. The image forming apparatus according to claim 1, wherein the one or more controllers are further configured to:
print an image acquired from the second job on a printing medium;
generate a scanned image by reading a printed material on which the image is printed; and
inspect the printed material based on comparing the scanned image and the reference image registered,
wherein the inspection processing to be executed upon receiving the second job is processing for inspecting the printed material.

6. The image forming apparatus according to claim 5, wherein the one or more controllers are configured to inspect the printed material based on the scanned image generated and a reference image corresponding to the scanned image and registered.

7. The image forming apparatus according to claim 1, wherein the reference image is image data obtained by performing raster image processor (RIP) processing on the image.

8. The image forming apparatus according to claim 1, wherein the one or more controllers are configured to issue identification information with respect to the reference image and transmit the identification information to the external controller in a case where the reference image is registered,
wherein the second job is a job to which the identification information is added.

9. The image forming apparatus according to claim 1, wherein the second job is transmitted from the external controller after the first job is executed by the image forming apparatus.

10. A method for controlling an image forming apparatus configured to communicate with an external controller configured to generate a job, the method comprising:
acquiring an image from a first job upon receiving the first job from the external controller and registering a reference image generated from the image;
executing inspection processing for inspecting a printed image acquired from a second job based on the printed image and the reference image registered, upon receiving the second job from the external controller; and
suspending the inspection processing and deleting the reference image registered upon receiving a cancellation instruction to cancel the second job from the external controller.

11. An external controller configured to communicate with an image forming apparatus having an inspection function, the external controller comprising:
one or more controllers having one or more processors and one or more memories, the one or more controllers configured to:
transmit a first job for causing the image forming apparatus to register a reference image to the image forming apparatus;
receive identification information with respect to the reference image from the image forming apparatus;
transmit a second job for causing the image forming apparatus to execute inspection processing to inspect a printed image acquired from the second job based on the printed image and the reference image registered, and to which the identification information received is added to the image forming apparatus; and
transmit a cancellation instruction to suspend the inspection processing and delete the reference image registered in the image forming apparatus to the image forming apparatus in a case where the second job is cancelled.

12. The external controller according to claim 11, wherein the one or more controllers are configured to:
set either deleting the registered reference image or not deleting the registered reference image in a case where the second job is cancelled; and
not transmit a cancellation instruction to delete the reference image registered in the image forming apparatus to the image forming apparatus in a case where not to delete the reference image is set.

13. The external controller according to claim 11, wherein the external controller communicates with an external apparatus, and wherein the one or more controllers are configured to:
receive an image to be printed from the external apparatus; and
generate the first job and the second job from the image received.

14. The external controller according to claim 13, wherein the cancellation instruction to cancel the second job is received from the external apparatus.

15. The external controller according to claim 11, wherein the one or more controllers are configured to display a selection screen for selecting either deleting the registered reference image or not deleting the registered reference image, and
wherein the one or more controllers are configured to generate the cancellation instruction including cancelling the second job and deleting the reference image by selection of deleting the reference image on the displayed selection screen.

16. A method for controlling an external controller configured to communicate with an image forming apparatus having an inspection function, the method comprising:
transmitting a first job for causing the image forming apparatus to register a reference image;
receiving identification information with respect to the reference image from the image forming apparatus;
transmitting a second job for causing the image forming apparatus to execute inspection processing to inspect a printed image acquired from the second job based on the printed image and the reference image registered, and to which the identification information received is added; and
transmitting a cancellation instruction to suspend the inspection processing and delete the reference image registered in the image forming apparatus to the image forming apparatus in a case where a cancellation instruction to cancel the second job is issued.

17. A method for controlling a system including an image forming apparatus configured to communicate with an external controller configured to process a job, the method comprising:
acquiring an image from a first job upon receiving the first job and registering a reference image generated from the image;
controlling execution of inspection processing for inspecting a printed image acquired from a second job based on the printed image and the reference image registered, upon receiving the second job; and
causing a computer to execute processing for suspending the inspection processing and deleting the registered reference image in a case where a cancellation instruction to cancel the second job is received.

18. The image forming apparatus according to claim 1, wherein the cancellation instruction includes an instruction to delete the reference image.

19. The image forming apparatus according to claim 1, wherein the one or more controllers are configured to cancel the second job and delete the reference image upon receiving the cancellation instruction.

* * * * *